(12) United States Patent
Wendel et al.

(10) Patent No.: US 6,432,864 B1
(45) Date of Patent: Aug. 13, 2002

(54) ACID-BLOCKED AMINE CATALYSTS FOR THE PRODUCTION OF POLYURETHANES

(75) Inventors: Stephan Herman Wendel, Oldenburg; Reza Fard-Aghaie, Hamburg, both of (DE)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/832,502

(22) Filed: Apr. 11, 2001

(51) Int. Cl.⁷ .............................. B01J 31/04; B01J 31/18
(52) U.S. Cl. ...................... 502/162; 502/167; 502/172; 560/76; 560/89; 560/127; 560/128; 560/190; 560/198; 560/205
(58) Field of Search ............................... 502/162, 167, 502/172; 560/76, 89, 127, 128, 190, 198, 205

(56) References Cited

U.S. PATENT DOCUMENTS 4,464,488 A  8/1984  Zimmerman et al. ....... 521/115
5,489,618 A  2/1996  Gerkin ....................... 521/128

FOREIGN PATENT DOCUMENTS

DE  19512480  10/1996
EP   0989146   3/2000

*Primary Examiner*—Rabon Sergent
(74) *Attorney, Agent, or Firm*—Mary E. Bongiorno

(57) ABSTRACT

Novel acid-blocked amine catalysts and their use in the preparation of polyurethanes. The acid-blocked amine catalysts have the general structure shown below:

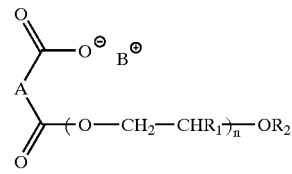

wherein A is the residue of an organic acid anhydride; $R_1$ is H or $C_1$ to $C_6$ alkyl; $R_2$ is H or $C_1$ to $C_6$ alkyl; n is an integer of 0 to 10; and B is a compound containing a protonated amine and one or more primary amine, secondary amine, or tertiary amine groups.

5 Claims, No Drawings

ACID-BLOCKED AMINE CATALYSTS FOR THE PRODUCTION OF POLYURETHANES

BACKGROUND OF THE INVENTION

Polyurethanes are useful in a variety of applications. For example, polyurethane elastomers are used in automotive parts, shoe soles, and other products in which toughness, flexibility, strength, abrasion resistance, and shock-absorbing properties are required. Polyurethanes are also used in coatings and in flexible and rigid foams.

Polyurethanes, in general, are produced by the reaction of a polyisocyanate and a polyol in the presence of a catalyst. The catalyst has typically been a low molecular weight tertiary amine such as triethylenediamine.

Polyurethane foams are produced through the reaction of a polyisocyanate with a polyol in the presence of various additives. One additive can be water which is used as a blowing agent. The blowing reaction produces carbon dioxide from the reaction of water with the polyisocyanate. Foams can be formed by a one-shot method or by formation of a prepolymer and subsequent reaction of the prepolymer with water in the presence of a catalyst to form the foam. Regardless of the method, a balance is needed between reaction of the isocyanate and the polyol (gelling) and the reaction of the isocyanate with water (blowing) in order to produce a polyurethane foam in which the cells are relatively uniform and the foam has specific properties depending on the anticipated application; for example, rigid foams, semi-rigid foams, and flexible foams.

The ability of the catalyst to selectively promote either gelling or blowing is an important consideration in selecting a catalyst for the production of a polyurethane foam with specific properties. If a catalyst promotes the blowing reaction to too high a degree, carbon dioxide will be evolved before sufficient reaction of isocyanate with polyol has occurred. The carbon dioxide will bubble out of the formulation, resulting in collapse of the foam and production of a poor quality foam. At the opposite extreme, if a catalyst promotes the gelling reaction too strongly, a substantial portion of the carbon dioxide will be evolved after a significant degree of polymerization has occurred. Again, a poor quality foam is produced; characterized by high density, broken or poorly defined cells, or other undesirable features. Frequently, a gelling catalyst and a blowing catalyst are used together to achieve the desired balance of gelling and blowing in the foam.

Tertiary amine catalysts are widely used in the production of polyurethanes. The tertiary amine catalysts accelerate both blowing (reaction of water with isocyanate to generate carbon dioxide) and gelling (reaction of polyol with isocyanate) and have been shown to be effective in balancing the blowing and gelling reactions to produce a desirable product. The most widely used commercial catalysts for producing polyurethanes are triethylenediamine (TEDA), also called 1,4-diazabicyclo[2.2.2]octane, and its derivatives.

Other catalysts known to be effective in the preparation of polyurethanes are those containing carboxyl functionality as well as tertiary amine groups. These catalysts are typically delayed action catalysts. Examples are described below:

U.S. Pat. No. 4,464,488 (Zimmerman et al., 1984) discloses the use of monocarboxylic acid salts of bis(aminoethyl)ether derivatives as catalysts in the preparation of polyurethanes.

DE 195 12 480 A1 (1996) disclose heat activated catalysts of the general formula:

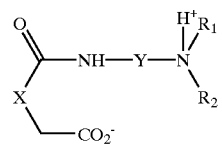

in which $R_1$ and $R_2$ are the same or different C1 to C20 alkyl, possibly containing oxygen atoms, or together with the N atom form a 5- or 6-membered ring possibly containing oxygen atoms, X is possibly a substituted alkylene having 2–3 carbon atoms, a 1,2-substituted cyclohexyl, or an ortho-substituted phenyl group, and Y is a possibly branched C2 to C6 alkyl, possibly containing heteroatoms (O, N, S). The catalysts are useful in the production of polyurethanes.

U.S. Pat. No. 5,489,618 (Gerkin, 1996) discloses a process for preparing a polyurethane foam according to the a one-shot foaming process using a delayed action amine salt catalyst. The catalyst is formed by reaction between a tertiary amine and a carboxylic acid having hydroxyl functionality.

EP 989 146 A1 (2000) discloses a delayed action catalyst for the production of polyurethanes that is a mixture of a tertiary amine and a saturated dicarboxylic acid. The catalyst is reported to be non-corrosive.

BRIEF SUMMARY OF THE INVENTION

This invention is directed to novel acid-blocked amine catalysts and their use in the preparation of polyurethanes. The acid-blocked amine catalysts have the general structure shown below

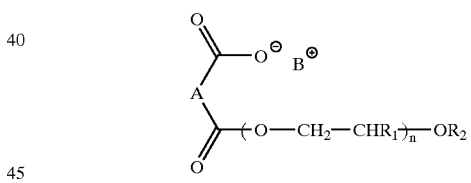

wherein A is the residue of an organic acid anhydride; $R_1$ is H or $C_1$ to $C_6$ alkyl; $R_2$ is H or $C_1$ to $C_6$ alkyl; n is an integer of 0 to 10; and B is a compound containing a protonated amine and one or more primary amine, secondary amine, or tertiary amine groups.

The acid-blocked amine catalysts of this invention are prepared by reacting an organic acid anhydride with a mono- or poly-alcohol, such as ethylene glycol or diethylene glycol, in the presence of an amine.

This invention is also directed to the use of the new acid-blocked amine catalysts as a catalyst in the production polyurethanes, especially polyurethane foams. Use of the acid-blocked amine catalysts of this invention results in a polyurethane with improved flowability and little or no corrosion. In addition, the novel blocking catalysts are useful in both MDI (diphenylmethane diisocyanate) and TDI (toluene diisocyanate) technologies and in high and low density foam applications.

DETAILED DESCRIPTION OF THE INVENTION

This invention is directed to new acid blocked amine catalysts and their use in the preparation of polyurethanes, especially polyurethane foams. The acid-blocked amine catalysts have the general structure shown below:

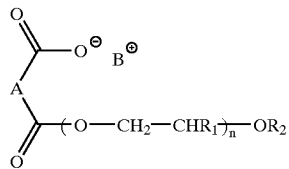

wherein A is the residue of an organic acid anhydride; $R_1$ is H or $C_1$ to $C_6$ branched or straight chain alkyl; $R_2$ is H or $C_1$ to C6 branched or straight chain alkyl; n is an integer of 0 to 10, preferably 1 to 2; and B is a compound containing a protonated amine and one or more primary amine, secondary amine, or tertiary amine groups.

Examples of A include a C2–C3 alkylene group which optionally may contain a double bond, such as ethyl, propyl, ethenyl, propenyl; 1,2-cyclohexylene which optionally may contain a double bond, or ortho-phenylene. Examples of $R_1$, when it is an alkyl group, or $R_2$ are H, methyl, ethyl, propyl, isopropyl, butyl, isobutyl, tert-butyl, pentyl, isopentyl, and hexyl. Examples of $B^+$ are protonated forms of dimethylaminopropylamine (DMAPA), triethylenediamine (TEDA), pentamethyldiethylenetriamine (PMDETA), pentamethyldipropylenetriamine (PMDPTA), bis(2-dimethylaminoethyl)ether (BDMAEE), N, N, N", N"-tetramethyldipropylene-triamine, N,N,N'-trimethyl-N'-hydroxyethyl-bis(aminoethyl)ether, N,N-bis-(3-dimethylaminopropyl)-N-isopropanolamine, N-(3-dimethylaminopropyl)-N,N-diisopropanolamine, N-(3-dimethylaminopropyl)urea, N,N'-bis(3-dimethylaminopropyl)urea, and 2-(2-dimethylaminoethoxy) ethanol.

The acid-blocked amine catalyst of this invention is prepared by reacting an anhydride, such as phthalic anhydride, maleic anhydride, succinic anhydride, 1,2-dicyclohexanedicarboxylic acid anhydride, and 3,4-dehydrocyclohexane-1,2-dicarboxylic acid anhydride with an alcohol, such as ethyleneglycol, methyldiethyoxyalcohol, or diethyleneglycol at 60° C.–120° C. for about 2 hours, and afterwards cooling the reaction mixture down to about 50–70° C. and slowly adding, with stirring, an amine, such as the above mentioned amines. An example of this reaction is shown below in which phthalic anhydride is reacted with BDMAEE in diethyleneglycol:

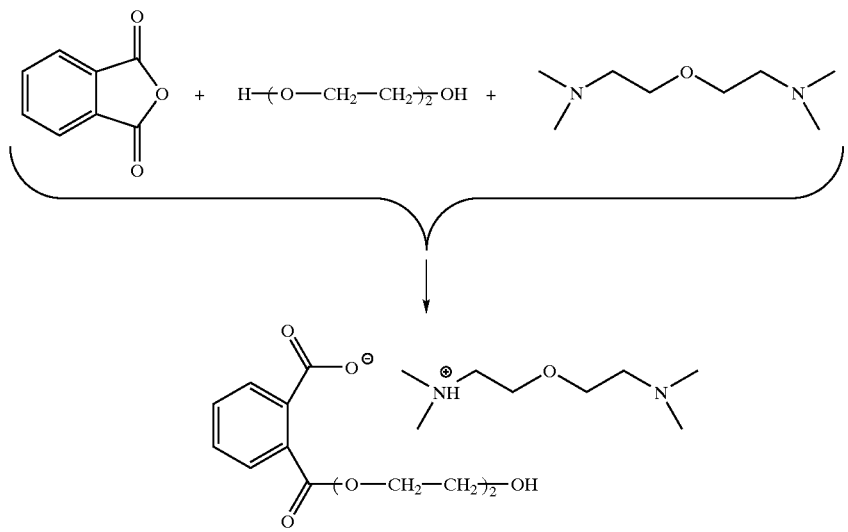

The amine, acid anhydride, and alcohol are typically reacted in a 1:1:1 molar ratio, although other molar ratios can be used. The reaction is allowed to run to completion; typically, approximately 2 hours. The completion of reaction is monitored by gas chromatography (GC).

The catalyst of this invention can catalyze the reaction between an isocyanate and a compound containing a reactive hydrogen, such as an alcohol, a polyol, an amine or water. It is particularly effective in catalyzing the blowing reaction, i.e., the reaction between an isocyanate and water, in the production of polyurethane foams.

The polyurethane products are prepared using any suitable organic polyisocyanates well known in the art including, for example, hexamethylene diisocyanate, phenylene diisocyanate, toluene diisocyanate (TDI) and diphenylmethane diisocyanate (MDI). Especially suitable are the 2,4- and 2,6-TDI's, individually or together, as their commercially available mixtures. Other suitable isocyanates are mixtures of diisocyanates known commercially as "crude MDI", also known as PAPI, which contain about 60% of 4,4'-diphenylmethane diisocyanate along with other isomeric and analogous higher polyisocyanates. Also suitable are "prepolymers" of these polyisocyanates comprising a partially prereacted mixture of a polyisocyanate and a polyether polyol or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and similar low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used. The molecular weight (Mn) of the polyol or the average Mn of the combination of polyols can range from 50 to 6000, preferably 800 to 6000. The hydroxyl number of the polyol can be 20 to 250, preferably 28 to 100 mg KOH/g polymer.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, methylene chloride, trichlorofluoromethane, and the like; and cell stabilizers such as silicones.

A catalytically effective amount of the catalyst composition is used in the polyurethane formulation. Suitable amounts of the catalyst composition may range from about 0.01 to 10 parts per 100 hundred parts polyol (phpp). Preferred amounts range from 0.05 to 1.0 phpp.

The catalyst composition may be used in combination with other tertiary amine, organotin and carboxylate urethane catalysts well known in the urethane art. For example, suitable gelling catalysts include but are not limited to trimethylamine, triethylamine, tributylamine, trioctylamine, diethyl cyclohexylamine, N-methyl-morpholine, N-ethylmorpholine, N-octadecylmorpholine (N-cocomorpholine), N-methyl-diethanolamine, N,N-dimethylethanolamine, N,N'-bis(2-hydroxypropyl) piperazine, N,N,N', N'-tetramethylethylene-diamine, N,N, N', N'-tetramethyl-1,3-propanediamine, triethylenediamine (1,4-diazabicyclo[2.2.2]octane), 1,8-diazabicyclo(5.4.0) undecene-7,1,4-bis(2-hydroxypropyl)-2-methylpiperazine, N,N-dimethylbenzylamine, N,N-dimethylcyclohexylamine, benzyltriethylammonium bromide, bis(N, N-diethylaminoethyl)adipate, N,N-diethylbenzylamine, N-ethylhexamethyleneamine, N-ethylpiperidine, alpha-methyl-benzyldimethylamine, dimethylhexadecylamine, dimethylcetylamine, and the like. Suitable blowing catalysts include but are not limited to bis(dimethylaminoethyl)ether, pentamethyldiethylenetriamine, 2-[N-(dimethylaminoethoxyethyl)-N-methylamino]-ethanol, and the like.

A general polyurethane flexible foam formulation having a 1–3.8 lb/ft³(16–60.9 kg/m³) density (e.g., automotive seating) containing a catalyst such as the catalyst composition according to the invention would comprise the following components in parts by weight (pbw):

| Component | Parts by Weight |
| --- | --- |
| Polyol | 20–100 |
| Polymer Polyol | 80–0 |
| Silicone Surfactant | 0.5–2.5 |
| Blowing Agent (e.g., water) | 2–4.5 |
| Crosslinker | 0.5–2 |
| Catalyst | 0.2–2 |
| Isocyanate Index | 70–115* |

*Isocyanate Index = (mole isocyanate/mole active hydrogen) × 100

The invention will be further clarified by a consideration of the following examples, which are intended to be purely exemplary of the invention.

EXAMPLE 1

The following ingredients have been used to prepare acid-blocked BDMAEE catalyst:

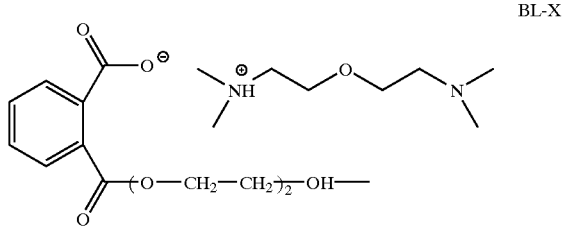

BL-X

| | | |
| --- | --- | --- |
| BDMAEE: | 37.0 p.b.w. | 0.23 mol |
| HO(CH₂CH₂O)₂H: | 28.8 p.b.w. | 0.27 mol |
| Phthalic anhydride: | 34.2 p.b.w. | 0.23 mol |

The alcohol was heated to 100° C. while stirring and the phthalic anhydride was added. After dissolving all of the phthalic anhydride, the reaction mixture was cooled down to 50 to 70° C. and the amine (BDMAEE) was added slowly. The solution was kept at about 60° C. for one hour to complete the reaction.

Table 1 shows MDI Flexible Molded Control Formulation A ("high density formulation") which was used to evaluate the performance benefits of the novel acid-blocked amine catalysts.

TABLE 1

| Component | pbw |
|---|---|
| Polyetherpolyol (OH # = 28) | 100 |
| Water | 3.10 |
| Diethanolamine (100%) | 0.60 |
| DABCO ® DC 2585 surfactant* | 1.00 |
| DABCO ® 33 LV catalyst** | 0.25 |
| Blocked blow catalyst | varied |
| MDI blend, 32.5% NCO | index 100 | pbw = parts by weight
*DABCO DC 2585 - silicon surfactant supplied by Air Products and Chemicals, Inc.
**DABCO 33LV - 33 wt % triethylenediamine in dipropylene glycol supplied by Air Products and Chemicals, Inc.

The catalysts were added to 125 g of the premix in a 32 oz. (951 ml) metal cup and the formulation was mixed for 20 seconds at 6000 RPM using an overhead stirrer fitted with a 2 inch (5.1 cm) diameter stirring paddle. Sufficient MDI was added to make a 100 index foam [index=(mole NCO/mole active hydrogen)×100] and the formulation was mixed well for 5 seconds using the same overhead stirrer. The whole mixture was poured into a 91 oz (2.7 l) paper cup. The 91 oz. cup was placed under an Ultrasonic rate-of-rise equipment to determine reaction times.

Times (in seconds) cited were from mixing of the polyol with isocyanate. Start time represents the time required for the foam formulation to start to rise and is an indication of reaction initiation. Delayed reaction initiation provides for delayed viscosity increase of the reacting foam mass and therefore provides for improved flowability. String Gel and Full Rise times are further measures of reaction progression and provide some indication of extent of cure. The results are shown in Table 2. Use levels were chosen to have the same BDMAEE content for all three catalysts.

TABLE 2

| CUP FOAM RESULTS - CONTROL FORMULATION A | | | | |
|---|---|---|---|---|
| | | Trials | | |
| | | 1 | 2 | 3 |
| DABCO ® BL-11 blow catalyst* | [pphp] | 0.25 | | |
| BL-X | [pphp] | | 0.48 | |
| NIAX A 400* | [pphp] | | | 0.39 |
| Start time | [sec] | 12 | 18 | 15 |
| String Gel time | [sec] | 55 | 85 | 73 |
| Full Rise time | [sec] | 78 | 116 | 104 |
| Max. height | [mm] | 224 | 214 | 220 |
| Final height | [mm] | 215 | 208 | 213 |
| Recession | [%] | 4.0 | 3 | 3 |
| Cup density | [Kg/m$^3$] | 43 | 45 | 44 |

*DABCO BL-11 - 70 wt % BDMAEE in dipropylene glycol; supplied by Air Products and Chemicals, Inc.
**Delayed action blow catalyst, containing BDMAEE in aqueous gluconic acid, supplied by Witco.

BL-X provided significant longer start time and rise time compared to the non-blocked BDMAEE based catalyst, DABCO BL 11. Furthermore BL-X provided significant longer start time compared to the competitive delayed action blow catalyst (NIAX A 400). The example also shows that BL-X provided excellent blocking behavior and excellent flowability.

To determine the extent of cure, hand-mixed pad foams (400 mm×400 mm×100 mm) were prepared in a heated mold (65±2° C.). Molded density was approximately 52 Kg/m$^3$. Formulations were according to Table 2. As an indicator for the extent of cure, the time was determined when the pad can be demolded without tearing or altering its shape and without post-expansion. The results are presented in Table 3.

TABLE 3

| Hand Mixed Pad Foam Results - Demolding Time | | | |
|---|---|---|---|
| | Trials | | |
| | 1 DABCO BL-11 | 2 BL-X | 3 NIAX A 400 |
| Demolding time | 3.0 min | 3.1 min | 3.2 min |

The results in Table 3 show that the curing time is not affected by stronger delayed start time achieved by BL-X compared to NIAX A 400.

EXAMPLE 2

The following MDI Flexible Molded control formulation (B) ("low density formulation") was used to evaluate the performance benefits of BL-X.

TABLE 4

| MDI FLEXIBLE MOLDED CONTROL FORMULATION B | |
|---|---|
| Polyetherpolyol (OH # = 28) | 100 |
| Water | 3.80 |
| Diethanolamine (100%) | 0.70 |
| DABCO DC 2585 | 1.00 |
| DABCO 33 LV | 0.30 |
| Blocked blow catalyst | varied |
| MDI blend, 32.5% NCO | index 100 |

BL-X was used as acid-blocked blow catalyst. Use levels were chosen to have the same BDMAEE content for all three catalysts. Results are shown in Table 5.

TABLE 5

| CUP FOAM RESULTS - CONTROL FORMULATION B | | | | |
|---|---|---|---|---|
| | | Trials | | |
| | | 1 | 2 | 3 |
| DABCO BL-11 | [pphp] | 0.25 | | |
| BL-X | [pphp] | | 0.48 | |
| NIAX A 400 | [pphp] | | | 0.39 |
| Start time | [sec] | 14 | 18 | 15 |
| String gel time | [sec] | 53 | 81 | 70 |
| Rise time | [sec] | 66 | 97 | 88 |
| Max. height | [mm] | 243 | 232 | 238 |
| Final height | [mm] | 224 | 219 | 224 |
| Recession | [%] | 8 | 6 | 5 |
| Cup density | [Kg/m$^3$] | 40 | 41 | 40 |

The results of Trial 2 show that BL-X provides longer start time compared to the non-blocked BDMAEE based DABCO BL 11. Furthermore BL-X provides significant longer start time compared to competitive delayed action blow catalyst (NIAX A 400). The demolding time was determined as described previously. Based on hand-mixed pad foams, the demolding time was similar for Trials 1–3. Also. the stronger delayed start time with BL-X did not affect the curing time.

EXAMPLE 3

Maleic acid was used to prepare an acid-blocked BDMAEE catalyst:

BL-Y

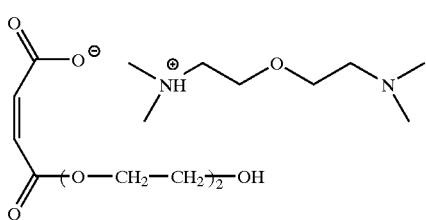

The following ingredients were used:

| BDMAEE: | 19.6 p.b.w. | 0.12 mol |
| HO(CH$_2$CH$_2$O)$_2$H: | 44.3 p.b.w. | 0.42 mol |
| Maleic anhydride: | 36.1 p.b.w. | 0.37 mol |

Ratio of acid/amine was 3.1 on molar basis

The following TDI Flexible Molded control formulation (C) was used to evaluate the performance benefits of BL-Y

| Ingredient | Pbw |
|---|---|
| Conventional polyol (OH #32) | 70 |
| Polymer polyol | 30 |
| Water | 4.0 |
| Diethanolamine (100%) | 1.40 |
| DABCO DC 5043 | 0.80 |
| DABCO 33 LV | 0.30 |
| Blocked blow catalyst | varied |
| TDI | Index 100 |

TABLE 6

CUP FOAM RESULTS - CONTROL FORMULATION C

| | | Trials | | |
|---|---|---|---|---|
| | | 1 | 2 | 3 |
| DABCO BL-11 | [pphp] | 0.10 | | |
| BL-Y | [pphp] | | 0.36 | |
| NIAX A 400 | [pphp] | | | 0.16 |
| Start time | [sec] | 13 | 17 | 13 |
| Rise time | [sec] | 79 | 113 | 86 |
| Max. height | [mm] | 211 | 202 | 208 |
| Final height | [mm] | 206 | 200 | 204 |
| Recession | [%] | 2 | 1 | 2 |
| Cup density | [Kg/m$^3$] | 42 | 43 | 42 |

Data from Example 3 show that BL-Y provided longer start time and rise time compared to the non-blocked catalyst, DABCO® BL 19. Furthermore BL-Y provided significant longer start time, compared to the competitive delayed action blow catalyst (NIAX A 400). Demolding time was determined as described in Example 1. Demolding time as an indicator for the extent of cure was similar for Trials 1–3.

EXAMPLE 4

Corrosion Test

To test corrosivity, stainless steel metal blades were stored with BL-X and with competitive blocked blow catalyst (NIAX A 400) for 2 weeks at 65° C. The weight of the blades was determined before and after storage time. The loss of weight is considered a measure for the corrosivity of the acid-blocked blow catalysts.

TABLE 7

CORROSIVITY TEST

| Catalyst | Weight before Mg | Weight after Mg | Weight loss mg | Weight loss % |
|---|---|---|---|---|
| BL-X | 836.3 | 833.7 | 2.6 | 0 |
| NIAX A 400 | 771.8 | 765.3 | 6.5 | 1 |

The results in Table 7 show that BL-X did not contribute to corrosion. Compared to NIAX A 400, it showed slightly better performance.

Summary of Results

EXAMPLE 1–4

The examples showed that the use of the novel acid-blocked amine catalysts provide for significant improved delay and therefore for significant improved flowability compared to market standards with no contribution to corrosivity. Furthermore the example show that the novel blocking technology is applicable to MDI and TDI technology and works in high and low density applications.

What is claimed is:

1. An acid-blocked amine catalyst having the general structure:

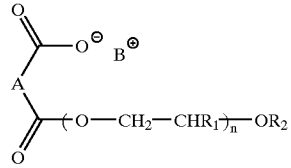

wherein A is the residue of an organic acid anhydride; $R_1$ is H or $C_1$ to C6 branched or straight chain alkyl; $R_2$ is H or $C_1$ to $C_6$ branched or straight chain alkyl; n is an integer of 0 to 10; and B is a compound containing a protonated amine and one or more primary amine, secondary amine, and/or tertiary amine groups.

2. The acid-blocked amine catalyst of claim 1 wherein A is a C2–C3 alkylene which optionally contains a double bond, a 1,2-cyclohexylene group which optionally contains a double bond, or an ortho-phenylene group.

3. The acid-blocked amine catalyst of claim 1 wherein $R_1$ is H; $R_2$ is H or methyl;. and n is 2.

4. The acid-blocked amine catalyst of claim 1 wherein B is a protonated form of dimethylaminopropylamine, triethylenediamine, pentamethyldiethylenetriamine, pentamethyldipropylenetriamine, bis(2-dimethylaminoethyl)ether, or N, N, N", N"-tetramethyldipropylene-triamine, N,N,N'-trimethyl-N'-hydroxyethyl-bis(aminoethyl)ether, N,N-bis-(3-dimethylaminopropyl)-N-isopropanolamine, N-(3-dimethylaminopropyl)-N,N-diisopropanolamine, N-(3-dimethylaminopropyl)urea, N,N'-bis(3-dimethylaminopropyl)urea, or 2-(2-dimethylaminoethoxy)ethanol.

5. The acid-blocked amine catalyst of claim 1 wherein A is a C2 alkylene optionally with a double bond, or an ortho-phenylene group; $R_1$ is H; $R_2$ is methyl; n is 1; and B is protonated bis(2-dimethylaminoethyl)ether.

* * * * *